(12) United States Patent
Bragstad et al.

(10) Patent No.: US 9,331,911 B2
(45) Date of Patent: May 3, 2016

(54) RESIZING RESOURCE ALLOCATION IN A COMPUTING ENVIRONMENT

(71) Applicant: International Business Machines Corporation, Armonk, NY (US)

(72) Inventors: Lance Bragstad, Pine Island, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 14/069,763

(22) Filed: Nov. 1, 2013

(65) Prior Publication Data

US 2015/0128053 A1    May 7, 2015

(51) Int. Cl.
| | |
|---|---|
| G06F 3/0484 | (2013.01) |
| G06F 9/44 | (2006.01) |
| H04L 12/24 | (2006.01) |
| H04L 12/911 | (2013.01) |

(52) U.S. Cl.
CPC ............. H04L 41/22 (2013.01); H04L 47/70 (2013.01); G06F 3/0484 (2013.01); G06F 9/4443 (2013.01)

(58) Field of Classification Search
CPC ....... H04L 41/22; H04L 47/70; G06F 3/0484; G06F 9/4443
See application file for complete search history.

(56) References Cited

U.S. PATENT DOCUMENTS

| | | | | |
|---|---|---|---|---|
| 5,550,970 A | * | 8/1996 | Cline | G06F 9/50 345/440 |
| 6,404,444 B1 | * | 6/2002 | Johnston | G06F 3/0605 345/440 |
| 8,484,149 B1 | * | 7/2013 | Kelly | G06Q 10/00 706/46 |
| 2003/0216890 A1 | * | 11/2003 | Gross | G06F 11/3414 702/186 |
| 2004/0012637 A1 | * | 1/2004 | Alford, Jr. | G06F 11/3466 715/772 |
| 2005/0093866 A1 | * | 5/2005 | Ebert | G06Q 10/06 345/440 |
| 2005/0235128 A1 | * | 10/2005 | Rustagi | G06F 3/0605 711/170 |
| 2009/0235198 A1 | * | 9/2009 | Migos | G06F 3/04847 715/780 |
| 2010/0083116 A1 | * | 4/2010 | Akifusa | G06F 3/0482 715/727 |
| 2010/0110932 A1 | * | 5/2010 | Doran | H04L 41/22 370/254 |
| 2012/0260179 A1 | * | 10/2012 | Reshadi | G06F 9/5061 715/735 |
| 2012/0330711 A1 | * | 12/2012 | Jain | G06Q 30/04 705/7.23 |

(Continued)

OTHER PUBLICATIONS

Openstack, "Increase or Decrease Server Size", OpenStack Compute Administration Manual, Nov. 9, 2012, Folsom, 2012.2 version, pp. 159-161, OpenStack LLC (openstack.org) online, URL: http://docs.openstack.org/folsom/openstack-compute/admin/content/index.html.

(Continued)

*Primary Examiner* — Eric J Bycer
(74) *Attorney, Agent, or Firm* — Edward J. Lenart; Feb Cabrasawan; Kennedy Lenart Spraggins LLP

(57) ABSTRACT

Resizing resource allocation in a computing environment, including: displaying, within a graphical user interface, a graphical element representing allocation parameters, the allocation parameters indicating a user's current allocation of one or more resources of the computing environment; displaying, within the graphical user interface, a graphical element representing utilization parameters, the utilization parameters indicating the user's current utilization of the one or more resources of the computing environment; receiving, within the graphical user interface, user input to manipulate the graphical element representing the allocation parameters; and changing, based on the user input received within the graphical user interface, the allocation parameters.

18 Claims, 10 Drawing Sheets

(56) References Cited

U.S. PATENT DOCUMENTS

| | | | | |
|---|---|---|---|---|
| 2013/0138816 A1* | 5/2013 | Kuo | ................. | G06F 9/5011 |
| | | | | 709/226 |
| 2013/0185433 A1* | 7/2013 | Zhu | ................. | H04L 67/303 |
| | | | | 709/226 |
| 2013/0290536 A1* | 10/2013 | Dutta | ................. | G06F 9/5027 |
| | | | | 709/226 |

OTHER PUBLICATIONS

Rackspace, "Managing Your Server 6—Resizing Your Server", Rackspace support, Aug. 8, 2013, 4 pages, rackspace.com (online), URL: http://www.rackspace.com/knowledge_center/article/managing-your-server-6-resizing-your-server-0.

Harvey, A., "Resizing/dev/sda1 on Amazon EC2", Category Archives, Amazon Cloud, Mar. 30, 2012, 4 pages, http://alexharvey.eu (online), URL: http://alexharvey.eu/etc/amazon-cloud/resizing-devsda1-on-amazon-ec2/.

Anonymous, "Manage Virtual Datacenters", Abiquo 2.3 User Guide, Oct. 17, 2012, 5 pages, abiquo.com (online), URL: http://wiki.abiquo.com/display/ABI23/Manage+Virtual+Datacenters#ManageVirtualDatacenters-AllocationLimitsManagement.

* cited by examiner

RESIZING RESOURCE ALLOCATION IN A COMPUTING ENVIRONMENT

BACKGROUND OF THE INVENTION

1. Field of the Invention

The field of the invention is data processing, or, more specifically, methods, apparatus, and products for resizing resource allocation in a computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Modern computing systems can include a plurality of machines that share resources with each other. Allocating resources to each machine, user, software application, or other consumer of computing resources can often be burdensome and difficult.

SUMMARY OF THE INVENTION

Methods, apparatuses, and products for resizing resource allocation in a computing environment, including: displaying, within a graphical user interface, a graphical element representing allocation parameters, the allocation parameters indicating a user's current allocation of one or more resources of the computing environment; displaying, within the graphical user interface, a graphical element representing utilization parameters, the utilization parameters indicating the user's current utilization of the one or more resources of the computing environment; receiving, within the graphical user interface, user input to manipulate the graphical element representing the allocation parameters; and changing, based on the user input received within the graphical user interface, the allocation parameters.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
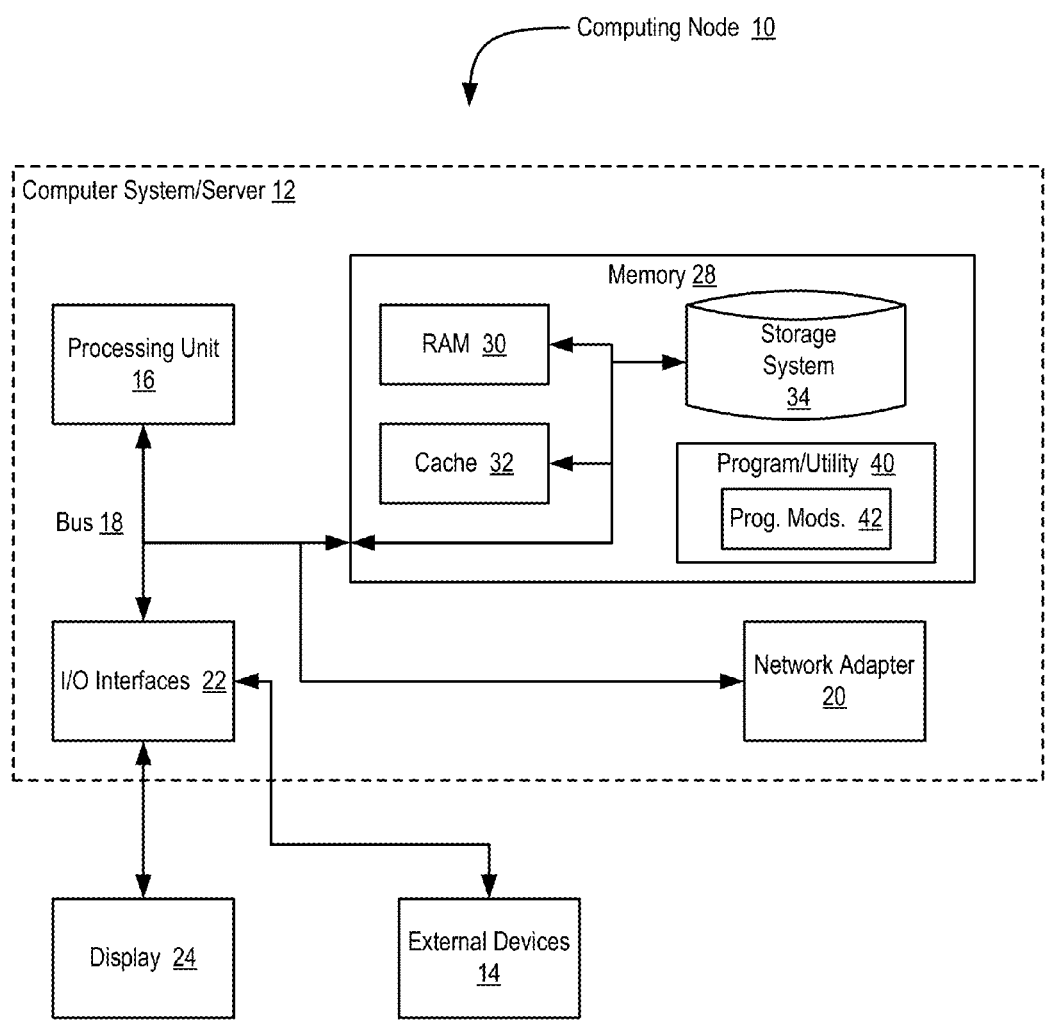
FIG. 1 depicts a cloud computing node according to an embodiment of the present invention.

Example methods, apparatus, and products for visually resizing resource allocation in a cloud computing environment in accordance with the present invention are described with reference to the accompanying drawings, beginning with FIG. 1. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service ('SaaS'): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service ('Paas'): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service ('IaaS'): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node (10) is only one example of a suitable cloud computing node and is not intended to suggest any limitation as to the scope of use or functionality of embodiments of the invention described herein. Regardless, cloud computing node (10) is capable of being implemented and/or performing any of the functionality set forth hereinabove.

In cloud computing node (10) there is a computer system/server (12), which is operational with numerous other general purpose or special purpose computing system environments or configurations. Examples of well-known computing systems, environments, and/or configurations that may be suitable for use with computer system/server (12) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (12) may be described in the general context of computer system executable instructions, such as program modules, being executed by a computer system. Generally, program modules may include routines, programs, objects, components, logic, data structures, and so on that perform particular tasks or implement particular abstract data types. Computer system/server (12) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server (12) in cloud computing node (10) is shown in the form of a general-purpose computing device. The components of computer system/server (12) may include, but are not limited to, one or more processors or processing units (16), a system memory (28), and a bus (18) that couples various system components including system memory (28) to processor (16).

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture ('ISA') bus, Micro Channel Architecture ('MCA') bus, Enhanced ISA ('EISA') bus, Video Electronics Standards Association ('VESA') local bus, and Peripheral Component Interconnect ('PCI') bus.

Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory ('RAM') (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of embodiments of the invention.

Program/utility (40), having a set (at least one) of program modules (42), may be stored in memory (28) by way of example, and not limitation, as well as an operating system, one or more application programs, other program modules, and program data.

Each of the operating system, one or more application programs, other program modules, and program data or some combination thereof, may include an implementation of a networking environment. Program modules (42) generally carry out the functions and/or methodologies of embodiments of the invention as described herein.

Computer system/server (12) may also communicate with one or more external devices (14) such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output ('I/O') interfaces (22). Still yet, computer system/server (12) can communicate with one or more networks such as a local area network (IAN), a general wide area network ('WAN'), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Figure 2:
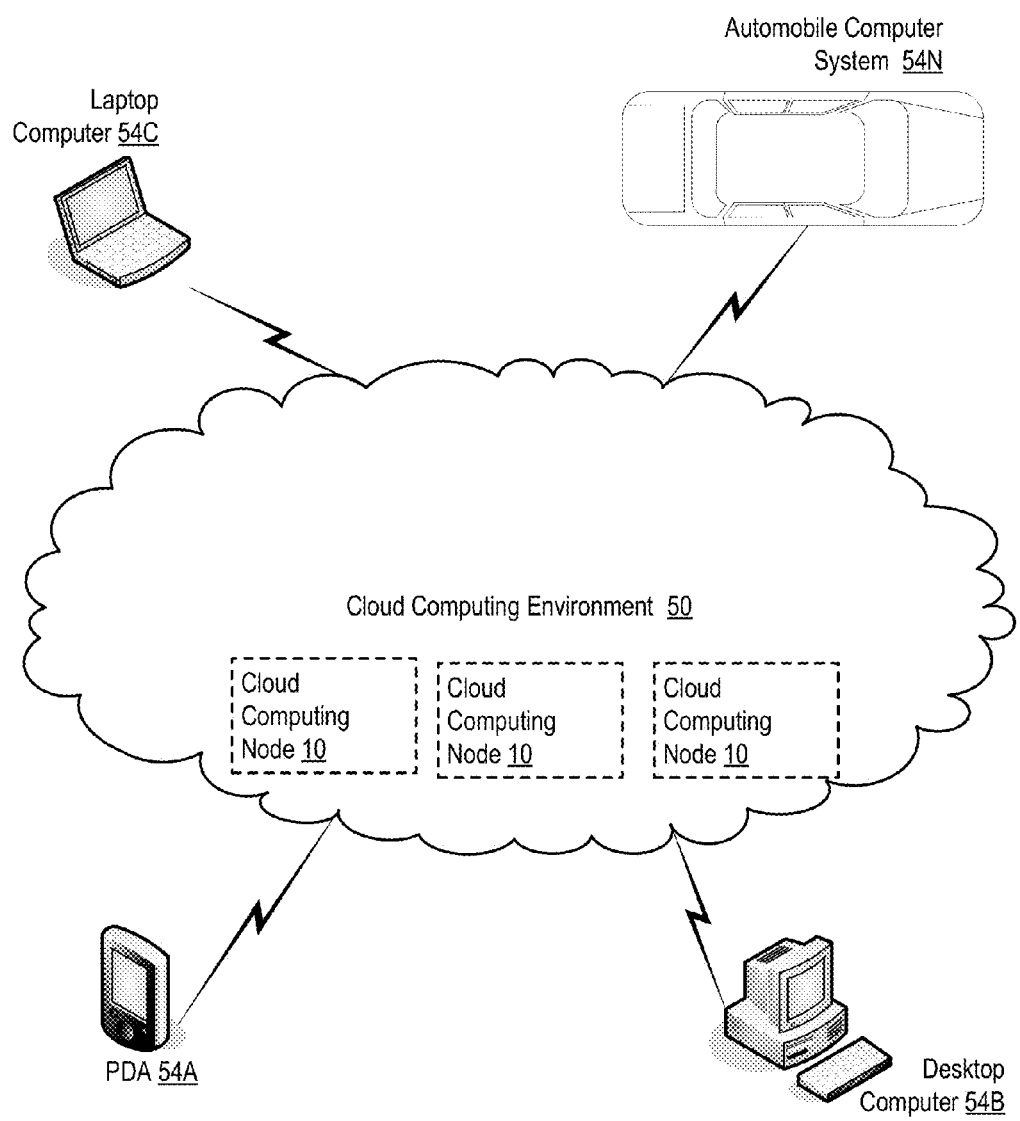
FIG. 2 depicts a cloud computing environment according to an embodiment of the present invention.

Referring now to FIG. 2, illustrative cloud computing environment (50) is depicted. As shown, cloud computing environment (50) comprises one or more cloud computing nodes (10) with which local computing devices used by cloud consumers, such as, for example, personal digital assistant ('PDA') or cellular telephone (54A), desktop computer (54B), laptop computer (54C), and/or automobile computer system (54N) may communicate. The cloud computing nodes (10) may communicate with one another. They may be grouped (not shown) physically or virtually, in one or more networks, such as Private, Community, Public, or Hybrid clouds as described hereinabove, or a combination thereof. This allows cloud computing environment (50) to offer infrastructure, platforms and/or software as services for which a cloud consumer does not need to maintain resources on a local computing device. It is understood that the types of computing devices (54A-N) shown in FIG. 2 are intended to be illustrative only and that computing nodes (10) and cloud computing environment (50) can communicate with any type of computerized device over any type of network and/or network addressable connection (e.g., using a web browser).

Figure 3:
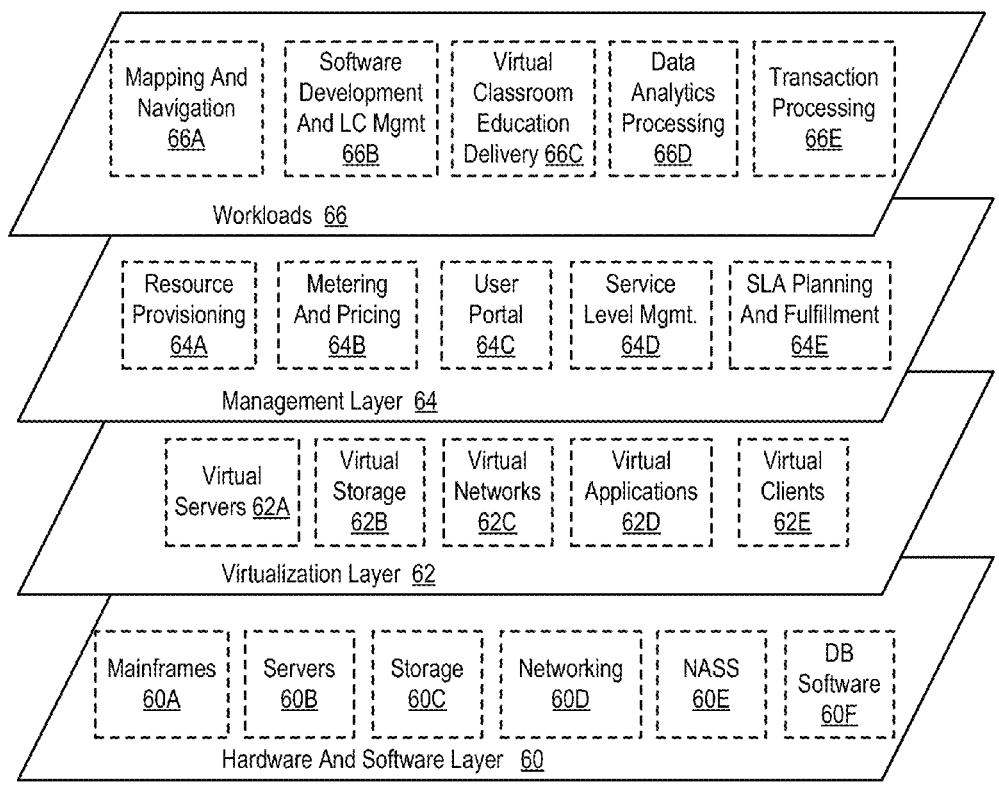
FIG. 3 depicts abstraction model layers according to an embodiment of the present invention.

Referring now to FIG. 3, a set of functional abstraction layers provided by cloud computing environment (element 50 in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer (60) includes hardware and software components. Examples of hardware components include mainframes (60A), in one example IBM® zSeries® systems; RISC (Reduced Instruction Set Computer) architecture based servers (60B), in one example IBM pSeries® systems; IBM xSeries® systems; IBM BladeCenter® systems; storage devices (60C); networks and networking components (60D). Examples of software components include network application server software (60E), in one example IBM WebSphere® application server software; and database software (60F), in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer (62) provides an abstraction layer from which the following examples of virtual entities may be provided: virtual servers (62A); virtual storage (62B); virtual networks (62C), including virtual private networks; virtual applications (62D) and operating systems; and virtual clients (62E).

In one example, management layer (64) may provide the functions described below. Resource provisioning (64A) provides dynamic procurement of computing resources and other resources that are utilized to perform tasks within the cloud computing environment. Metering and Pricing (64B) provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal (64C) provides access to the cloud computing environment for consumers and system administrators. Service level management (64D) provides cloud computing resource allocation and management such that required service levels are met. Service Level Agreement (SLA) planning and fulfillment (64E) provides pre-arrangement for, and procurement of, cloud computing resources for which a future requirement is anticipated in accordance with an SLA.

Workloads layer (66) provides examples of functionality for which the cloud computing environment may be utilized. Examples of workloads and functions which may be provided from this layer include: mapping and navigation (66A); software development and lifecycle management (66B); virtual classroom education delivery (66C); data analytics processing (66D); and transaction processing (66E).

Figure 4:
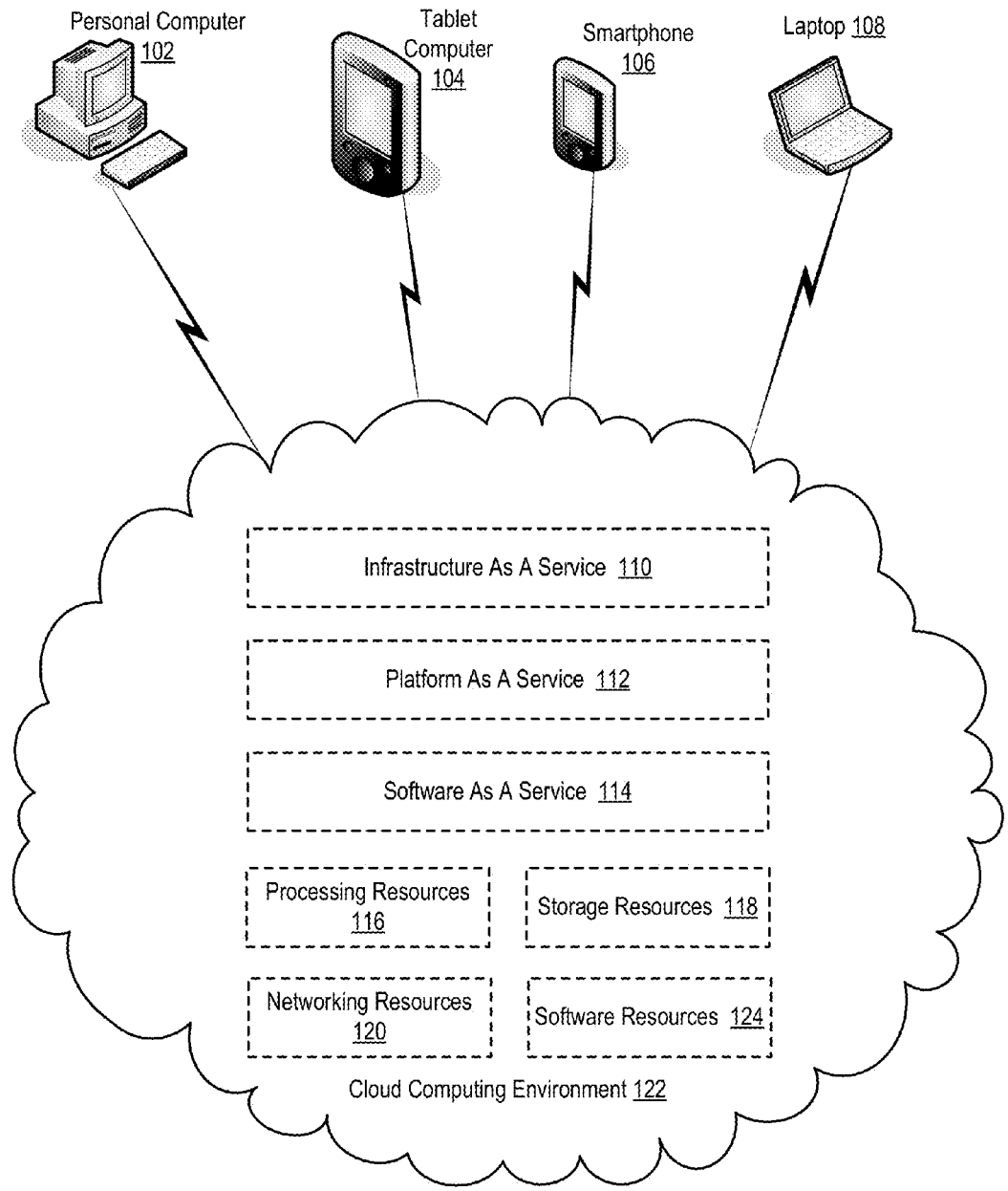
FIG. 4 sets forth a network diagram of a computing environment in which resource allocations may be visually resized according to embodiments of the present invention.

FIG. 4 sets forth a network diagram of a cloud computing environment (122) in which resource allocations may be visually resized. Cloud computing, as the term is used here, represents a model for enabling ubiquitous, convenient, on-demand access to a shared pool of configurable computing resources. Such computing resources can include data communications networks, computing machinery such as servers, computer storage, software applications, and other resources that that may be rapidly provisioned and released with minimal management effort or interaction from the cloud computing service provider. In the example of FIG. 4, the cloud computing environment (122) can include such a collection of computing resources.

The cloud computing environment (122) of FIG. 4 includes processing resources (116), storage resources (118), networking resources (120), and software resources (124). The processing resources (116) depicted in FIG. 4 represent computer hardware for executing computer program instructions. Such computer hardware can include computer processors and other forms of digital circuit circuitry that may be included in servers, compute nodes, standalone computers, and so on. The storage resources (118) of FIG. 4 represent computer hardware for storing data. Such hardware can includes disk arrays, hard drives, random access memory ('RAM'), and other forms of computer memory that that may be included in servers, compute nodes, standalone computers, and so on. The networking resources (120) depicted in FIG. 4 represent computer hardware for facilitating data communications between various resources inside the cloud computing environment (122) and for facilitating data communications with computing devices that connect to the cloud computing environment (122). Such computer hardware can include network switches, routers, communications adapters that may be included in servers, compute nodes, standalone computers, and so on. The software resources (124) depicted in FIG. 4 represent computer program instructions that may be executed on the processing resources (116), stored on the storage resources (118), and may communicate over the networking resources (120). Such computer program instructions may include operating systems, special purpose software applications, firmware, and so on. Although the processing resources (116), storage resources (118), networking resources (120), and software resources (124) are depicted as being distinct, readers will appreciate that many of these resources may reside within a single computer such as a server. The separation of such resources is only included to identify the various functionalities provided by each resource.

The cloud computing environment (122) of FIG. 4 may utilize the various resources (116, 118, 120, 124) that reside within the cloud computing environment (122) to provide services to users of the cloud computing environment (122). The cloud computing environment (122) can offer such services according to several fundamental models: infrastructure as a service ('IaaS') (110), platform as a service ('PaaS') (112), and software as a service ('SaaS') (114).

IaaS (110) is a service model in which the cloud computing environment (122) offers computers to users of the cloud computing environment (122). Such computers may be embodied as physical computers or virtual machines that are executing on underlying physical resources with the use of a hypervisor. In such an example, pools of hypervisors in the cloud computing environment (122) may offer a large number of virtual machines to users of the cloud computing environment (122). PaaS (112) is a service model in which the cloud computing environment (122) offers computing platforms to users of the cloud computing environment (122). Such computing platforms can include operating systems, databases, web servers, programming language execution environments, and so on. Saas (114) is a service model in which the cloud computing environment (122) offers access to software applications to users of the cloud computing environment (122).

Many types of devices may communicate with the cloud computing environment (122) of FIG. 4 and may take advantage of the services provided by the cloud computing environment (122). In the example of FIG. 4, a personal computer (102), tablet computer (104), smartphone (106), and laptop computer (108) are depicted as being coupled for data communications with the cloud computing environment (122), although readers will appreciate that many other types of computing devices may also be coupled for data communications with the cloud computing environment (122). Such devices may be coupled for data communications with the cloud computing environment (122), for example, over a data communications network such as the Internet, telecommunications networks, wireless networks, and so on.

The arrangement of computing resources and other devices making up the example cloud computing environment (122) illustrated in FIG. 4 are for explanation, not for limitation. Cloud computing environments useful according to various embodiments of the present invention may include additional servers, routers, other devices, and peer-to-peer architectures, not shown in FIG. 4, and so on. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 4. Readers will further appreciate that many of the devices illustrated in FIG. 4 may be embodied as virtualized devices. For example, the cloud computing environment (122) may include virtual machines coupled for data communications by virtual routers and other virtualized networking components.

Readers will further appreciate that the example cloud computing environment (122) illustrated in FIG. 4 is simply one example of a cloud computing environment. Cloud computing environments according to embodiments of the present application may take many other forms, and may actually be implemented across multiple clouds. For example, one cloud could have a private IaaS on a single server provider while two different private clouds run AaaS using different implementations of hardware.

Figure 5:
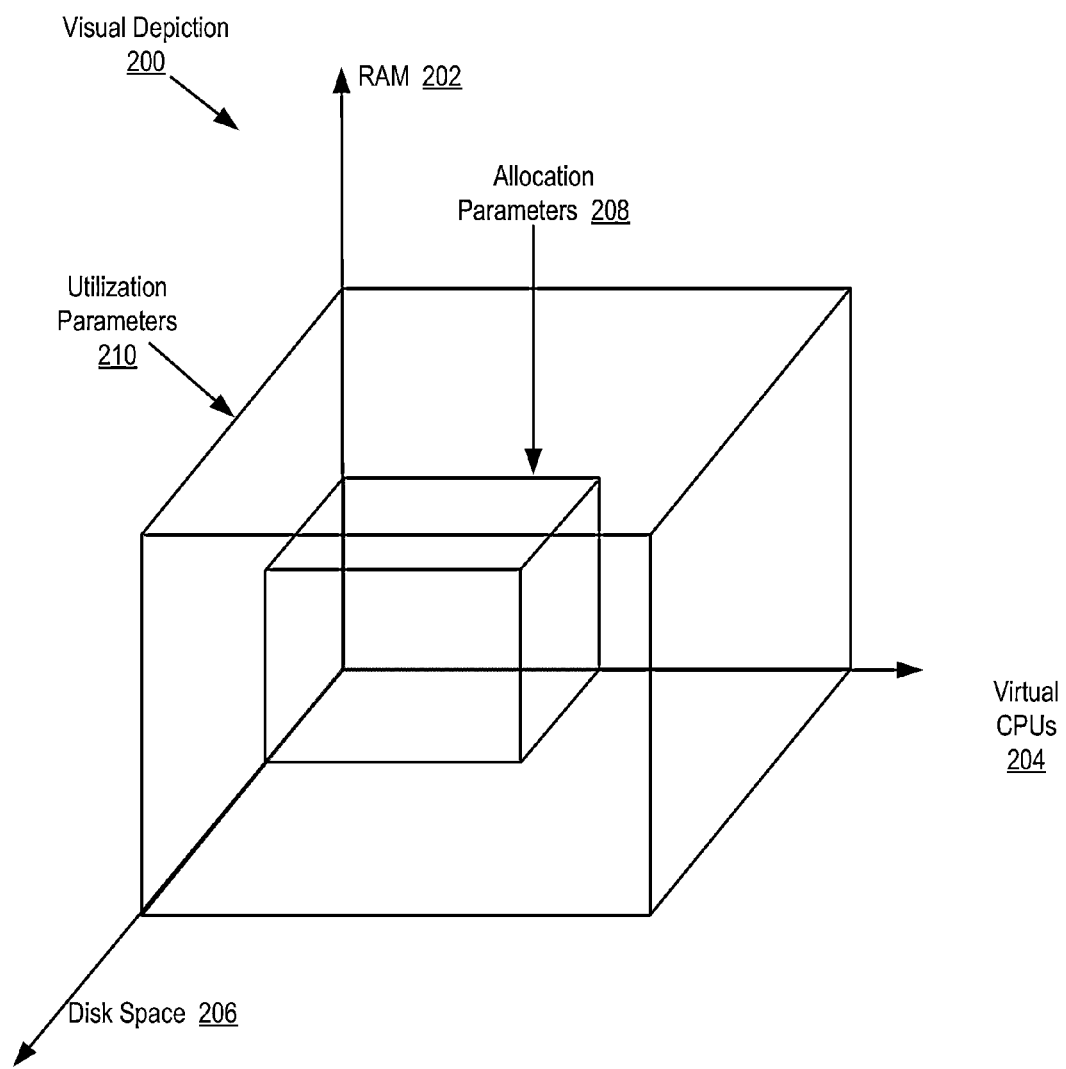
FIG. 5 sets forth an example of a visual depiction of one or more resources in a computing environment according to embodiments of the present invention.

For further explanation, FIG. 5 sets forth an example of a visual depiction (200) of one or more resources in a cloud computing environment according to embodiments of the present invention. The visual depiction (200) of FIG. 5 may be embodied as a graphical representation of the extent to which various resources in a cloud computing environment are being utilized, the amount of resources that are allocated for use, and so on. Such a visual depiction (200) of one or more resources in a cloud computing environment may be rendered, for example, through the use of a graphical user interface ('GUI') displayed on a display device that is accessible to a user, as explained in more detail below.

The visual depiction (200) of FIG. 5 includes three axes, labeled as Virtual CPUs (204), RAM (202), and Disk Space (206). In the example of FIG. 5, the Virtual CPUs (204) axis may be configured to represent the number of virtual central processing units ('CPUs') allocated for use and currently being utilized. The RAM (202) axis of FIG. 5 may be configured to represent the amount of RAM allocated for use and currently being utilized. The Disk Space (206) axis may be configured to represent the amount of disk storage allocated for use and currently being utilized.

The visual depiction (200) of FIG. 5 includes a graphical element representing allocation parameters (208) of the cloud computing environment. In the example of FIG. 5, the allocation parameters (208) of the cloud computing environment represent the amount of cloud resources allocated for use by a user. Such a user can include one or more software applications, one or more computing devices, a particular business entity, or any combination thereof. Readers will appreciate that the term 'user' is used in this application to include people, business organizations, as well as the computing resources (e.g., hardware and software resources) used by such people and business organizations.

The visual depiction (200) of FIG. 5 also includes a graphical element representing the utilization parameters (210) of the cloud computing environment. In the example of FIG. 5, the utilization parameters (210) of the cloud computing environment represent the amount of cloud resources utilized by the user. Readers will appreciate that in the example of FIG. 5, the amount of cloud resources utilized by the user exceeds the amount of cloud resources allocated for use by the user. As such, the user that is viewing the visual depiction (200) is currently utilizing more resources of the cloud computing environment than are allocated for use by the user. In such an example, the user may have to pay additional fees to the provider of the cloud resources, the cloud resources that are utilized in excess of the allocated resources may not perform as well as the allocated resources, and so on. In many cases, the amount of cloud resources that are being used by the user that is viewing the visual depiction (200) will be less than the amount of resources allocated for use by the user that is viewing the visual depiction (200). The situation in which the user is using more resources than are allocated for use by the user is depicted here, however, to illustrate the benefit of being able to visually resize resource allocation in a cloud computing environment in accordance with the present invention.

Readers will further appreciate that although the graphical elements representing the amount of cloud resource utilized by the user and the graphical elements representing the amount of cloud resources allocated for use by the user are depicted in FIG. 5 as being cubes, such graphical elements may be depicted using other regular geometrical shapes, irregular shapes, or any combination thereof. Furthermore, each axis may be scaled in a way so as to make the graphical elements representing the amount of cloud resource utilized a regular geometrical shape, so as to make the graphical elements representing the amount of cloud resources allocated for use by the user a regular geometrical shape, or by taking the resultant geometry of both graphical elements into account so as to attempt to make the geometries of each graphical element as regular as possible. Readers will appreciate that the visual depiction (200) of FIG. 5 is for explanation and not for limitation. Visual depictions of cloud resources may take many other forms and may track the allocation and usage of many other cloud resources.

Figure 6:
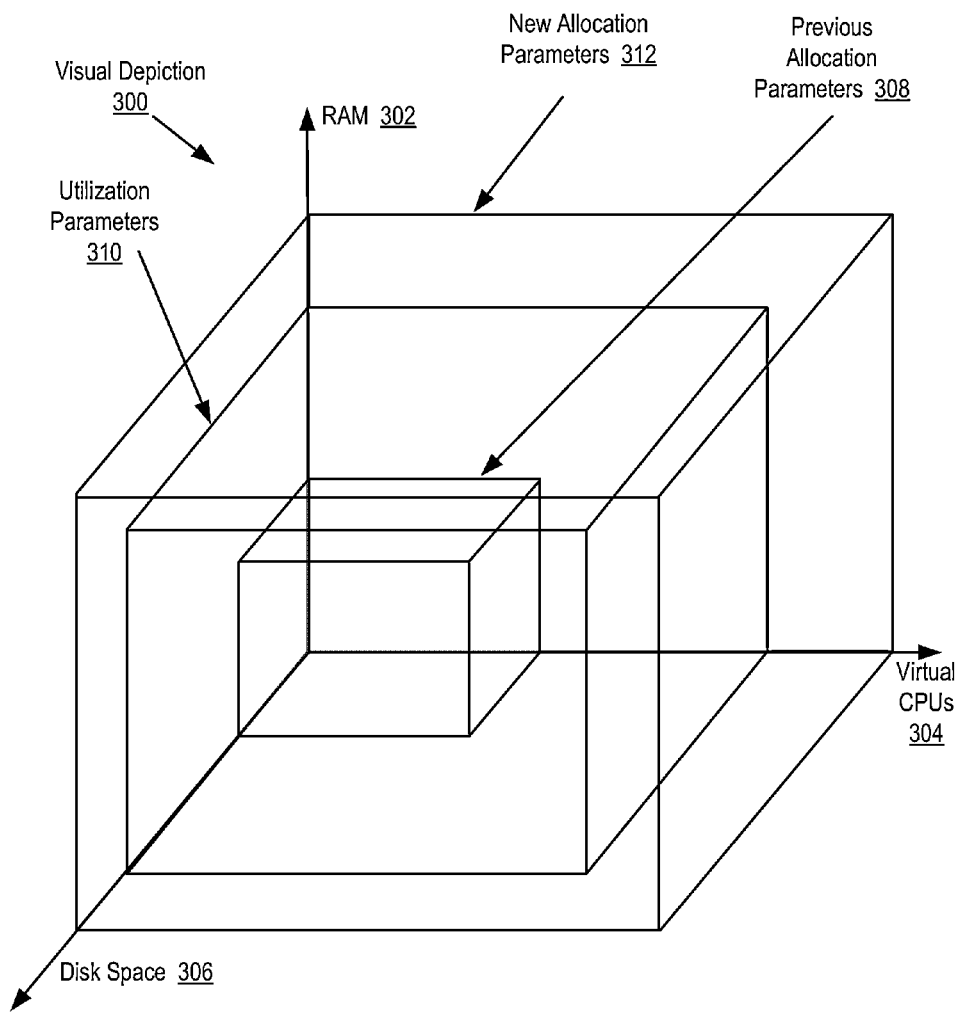
FIG. 6 sets forth an example of a visual depiction of one or more resources in a computing environment according to embodiments of the present invention.

For further explanation, FIG. 6 sets forth an example of a visual depiction (300) of one or more resources in a cloud computing environment according to embodiments of the present invention. The visual depiction (300) of FIG. 6 is similar to the visual depiction of FIG. 5. The visual depiction (300) of FIG. 6 may be embodied as a graphical representation of the extent to which various resources in a cloud computing environment are being utilized, the amount of resources that are allocated for use, and so on. Such a visual depiction (300) of one or more resources in a cloud computing environment may be rendered, for example, through the use of a GUI displayed on a display device that is accessible to a user, as explained in more detail below.

The visual depiction (300) of FIG. 6 includes three axes, labeled as Virtual CPUs (304), RAM (302), and Disk Space (306). In the example of FIG. 6, the Virtual CPUs (304) axis may be configured to represent the number of virtual central processing units ('CPUs') allocated for use and currently being utilized. The RAM (302) axis of FIG. 6 may be configured to represent the amount of RAM allocated for use and currently being utilized. The Disk Space (306) axis may be configured to represent the amount of disk storage allocated for use and currently being utilized.

The visual depiction (300) of FIG. 6 includes a graphical element representing previous allocation parameters (308) of the cloud computing environment. In the example of FIG. 6, the previous allocation parameters (308) of the cloud computing environment represent the amount of cloud resources previously allocated for use by a user, such as an application. The visual depiction (300) of FIG. 6 also includes a graphical element representing the utilization parameters (310) of the cloud computing environment. In the example of FIG. 6, the utilization parameters (310) of the cloud computing environment represent the amount of cloud resources utilized by the user. Readers will appreciate that in the example of FIG. 6, the amount of cloud resources utilized by the user exceeds the amount of cloud resources allocated for use by the user. As such, the user that is viewing the visual depiction (300) is currently utilizing more resources of the cloud computing environment than are allocated for use by the user. In such an example, the user may have to pay additional fees to the provider of the cloud resources, the cloud resources that are utilized in excess of the allocated resources may not perform as well as the allocated resources, and so on.

In order to increase the amount of cloud resources allocated for use by a user, the user may utilize a GUI to adjust the amount of cloud resources allocated for use by the user. For example, the user may adjust the amount of cloud resources allocated for use by the user by utilizing a mouse or other input device to expand the graphical element representing the previous allocation parameters (308), thereby creating the new allocation parameters (312). In such an example, additional resources may be allocated in the cloud computing environment for use by the user that is viewing the visual depiction (300) in response to the user manipulating a graphical element within the GUI.

Figure 7:
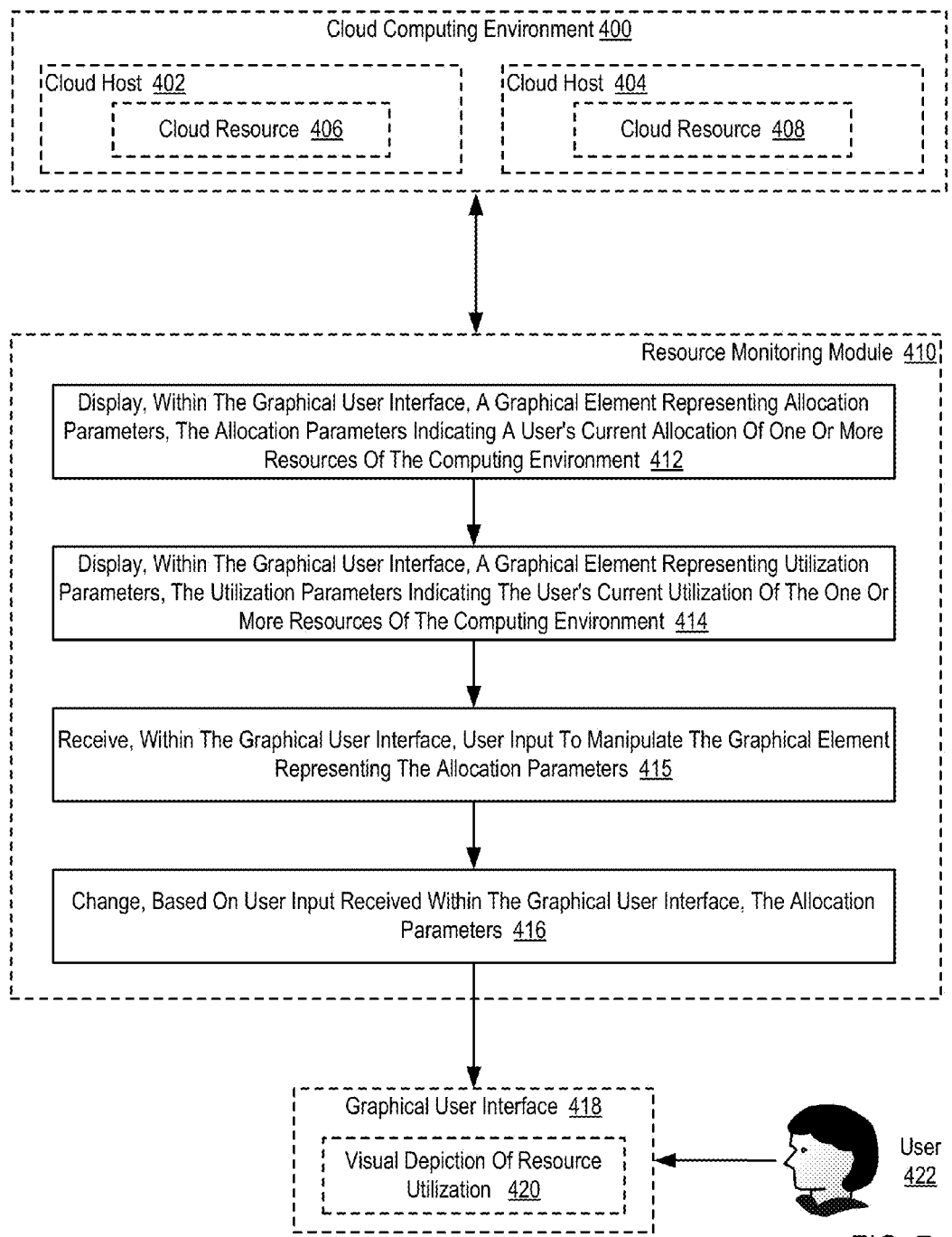
FIG. 7 sets forth a flow chart illustrating an example method for resizing resource allocation in a computing environment according to embodiments of the present invention.

For further explanation, FIG. 7 sets forth a flow chart illustrating an example method for resizing resource allocation in a cloud computing environment (400) according to embodiments of the present invention. In the example method of FIG. 7, the cloud computing environment (400) may be similar to the cloud computing environment (122) depicted in FIGS. 1-4. The cloud resources (406, 408) of such a cloud computing environment (400) can therefore include various services, virtual resources, physical resources, and other resources such as illustrated in FIGS. 1-4. Likewise, the cloud hosts (402, 404) of such a cloud computing environment (400) can include physical resources such as servers and computers, as well as virtual resources such as virtual machine, and additional resources as depicted and described with respect to FIGS. 1-4.

The example method of FIG. 7 is depicted as being carried out by a resource monitoring module (410). In the example of FIG. 7, the resource monitoring module (410) may be embodied as computer program instructions executing on computer hardware. Readers will appreciate that the resource monitoring module (410) may reside on a single physical machine, on a single virtual machine, or may be distributed across multiple physical machines, multiple virtual machines, or any combination thereof.

The example method of FIG. 7 includes displaying (412), within a graphical user interface (418), a graphical element representing allocation parameters. In the example of FIG. 7, the allocation parameters indicate a user's current allocation of one or more resources (406, 408) of the cloud computing environment (400). As described above, allocation parameters represent the amount of cloud resources allocated for use by a user (422), such as an application, a business entity, a particular computer, or other form of user. For example, the allocation parameters may describe how many processors in a cloud computing environment (400) are available for use by the user (422), how much memory in a cloud computing environment (400) is available for use by the user (422), how many virtual machines in a cloud computing environment (400) are available for use by the user (422), how many instances of a particular application in a cloud computing environment (400) are available for use by the user (422), and so on.

In the example method of FIG. 7, displaying (412) a graphical element representing the allocation parameters within a graphical user interface (418) may be carried out by displaying the allocation parameters within a visual depiction of one or more resources (406, 408) in the cloud computing environment (400) that is similar to the visual depiction described above with reference to FIGS. 5-6. In the example method of FIG. 7, the resource monitoring module (410) may be configured to communicate with an administrative module within the cloud computing environment (400), such as any module that comprises the management layer described above with reference to FIG. 3. In such an example, the resource monitoring module (410) may send a message to the administrative module within the cloud computing environment (400) requesting information describing the amount and kind of resources (406, 408) in the cloud computing environment (400) that are allocated for use by the user (422). Alternatively, the administrative module within the cloud computing environment (400) may be configured to provide information describing the amount and kind of resources (406, 408) in the cloud computing environment (400) that are allocated for use by the user (422) on a periodical basis. In such a way, the resource monitoring module (410) may receive the information describing the amount and kind of resources (406, 408) in the cloud computing environment (400) that are allocated for use by the user (422) by communicating with an administrator or administrative module within the cloud computing environment (400).

The example method of FIG. 7 also includes displaying (414), within the graphical user interface (418), a graphical element representing utilization parameters. In the example method of FIG. 7, the utilization parameters indicate the user's current utilization of the one or more resources (406, 408) of the cloud computing environment (400). As described above, the utilization parameters represent the amount of cloud resources currently being used by the user (422), such as an application, a business entity, a particular computer, or other form of user. For example, the utilization parameters indicating the user's current utilization of the one or more resources (406, 408) of the cloud computing environment (400) may describe how many processors in a cloud computing environment (400) are currently being used by the user (422), how much memory in the cloud computing environment (400) is currently being used by the user (422), how many virtual machines in the cloud computing environment (400) are currently being used by the user (422), how many instances of a particular application in a cloud computing environment (400) are currently being used by the user (422), and so on.

In the example method of FIG. 7, displaying (414) a graphical element representing the utilization parameters may be carried out by displaying the utilization parameters within a visual depiction of one or more resources (406, 408) in the cloud computing environment (400) that is similar to the visual depiction described above with reference to FIGS. 5-6. In the example method of FIG. 7, the resource monitoring module (410) may be configured to communicate with an administrative module within the cloud computing environment (400), such as a module in the management layer described above with reference to FIG. 3. In such an example, the resource monitoring module (410) may send a message to the administrative module within the cloud computing environment (400) requesting information describing the amount and kind of resources (406, 408) in the cloud computing environment (400) that are currently being used by the user (422). Alternatively, the administrative module within the cloud computing environment (400) may be configured to provide information describing the amount and kind of resources (406, 408) in the cloud computing environment (400) that are currently being used by the user (422) on a periodical basis. In such a way, the resource monitoring module (410) may receive the information describing the amount and kind of resources (406, 408) in the cloud computing environment (400) that are currently being used by the user (422) by communicating with an administrator or administrative module within the cloud computing environment (400).

The example method of FIG. 7 also includes receiving (415), within the graphical user interface (418), user input to manipulate the graphical element representing the allocation parameters. In the example method of FIG. 7, user input to manipulate the graphical element representing the allocation parameters may be received from a user input device such as a mouse. Such user input to manipulate the graphical element representing the allocation parameters may therefore include the user (422) selecting the graphical element that represents the allocation parameters and dragging the mouse so as to expand the size of the graphical element. In such a way, receiving (415) user input to manipulate the graphical element representing the allocation parameters may therefore be carried out by monitoring such user input devices.

The example method of FIG. 7 also includes changing (416), based on user input received via the graphical user interface (418), the allocation parameters. In the example method of FIG. 7, the user input may include information received from an input device such as a mouse, a keyboard, a touchscreen display, or other form of user input. Such user input may be embodied as an input event in which the user (422) manipulates a graphical element displayed within the graphical user interface (418). For example, the user (422) may utilize a mouse to select and expand a cube or other graphical element representing the allocation parameters, which indicate the user's (422) current allocation of one or more resources (406, 408) of the cloud computing environment (400). In such an example, the resource monitoring module (410) may detect the extent to which the graphical element representing the allocation parameters has been expanded, detect the values associated with the expanded graphical element, and send a message to a cloud system management module requesting that additional resources be allocated to the user (422) such that the resources (406, 408) allocated for use by the user (422) match the resource allocation values associated with the expanded graphical element.

Figure 8:
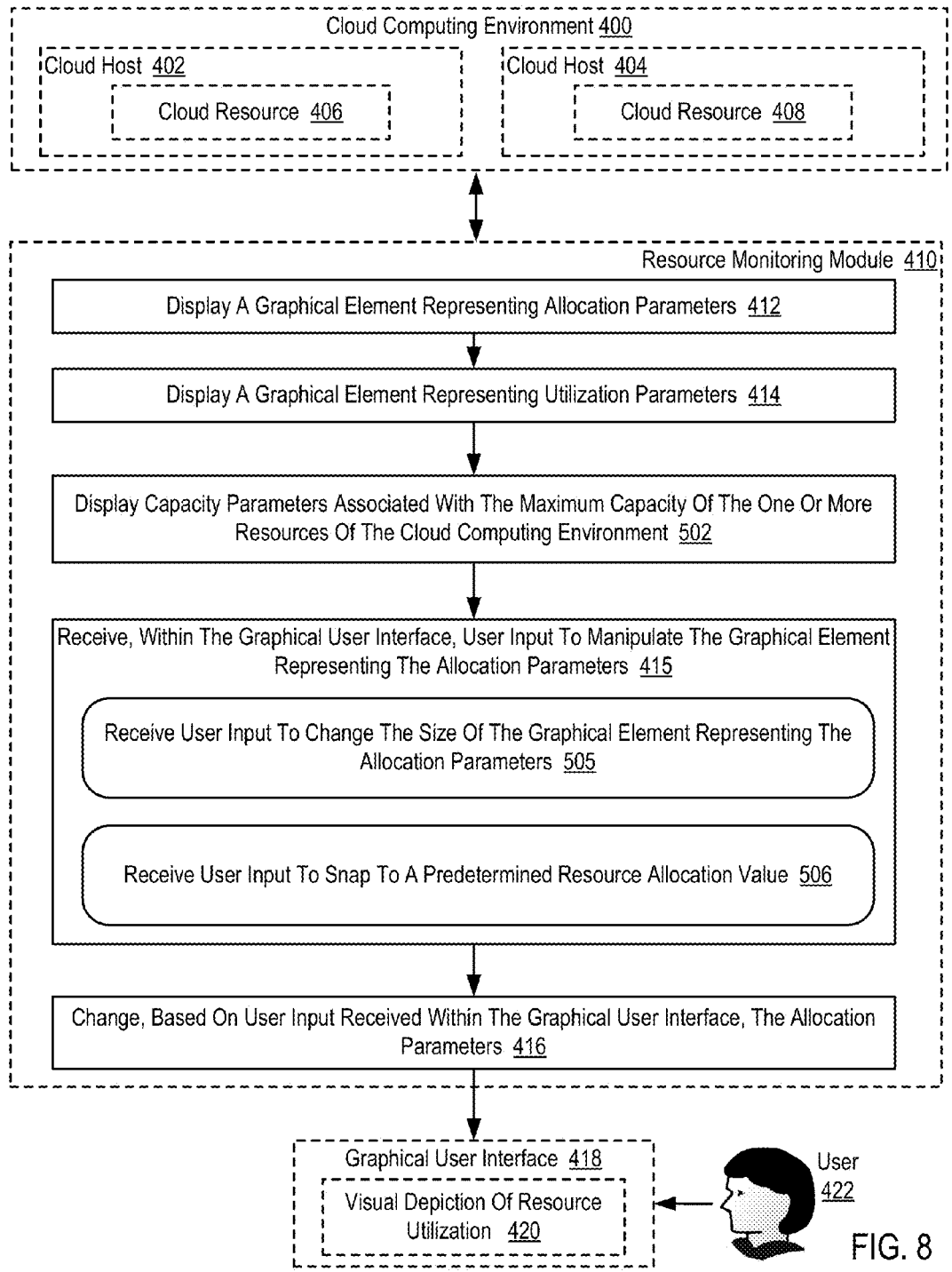
FIG. 8 sets forth a flow chart illustrating an additional example method for resizing resource allocation in a computing environment according to embodiments of the present invention.

For further explanation, FIG. 8 sets forth a flow chart illustrating an additional example method for resizing resource allocation in a cloud computing environment (400) according to embodiments of the present invention. The example method of FIG. 8 is similar to the example method of FIG. 7, as it also includes displaying (412) allocation parameters indicating a user's current allocation of one or more resources (406, 408) of the cloud computing environment (400), displaying (414) utilization parameters indicating the user's current utilization of the one or more resources (406, 408) of the cloud computing environment (400), receiving (415) user input to manipulate the graphical element representing the allocation parameters, and changing (416) the allocation parameters.

In the example method of FIG. 8, receiving (415) user input to manipulate the graphical element representing the allocation parameters can include receiving (505), via the graphical user interface (418), user input to change the size of the graphical element representing the allocation parameters. In the example method of FIG. 8, user input to change the size of the graphical element representing the allocation parameters may be received through the use of a user input device such as a mouse. For example, the user (422) may select a graphical element that represents the allocation parameters and manipulate such a graphical element by dragging a pointer so as to expand or contract the graphical element, by clicking on an axis in the graphical user interface (418) so as to change the allocation of a particular resource associated with the axis, and so on. In such an example, receiving (505) user input to change the size of the graphical element representing the allocation parameters may be carried out by monitoring an input device for user input.

In the example method of FIG. 8, receiving (415) user input to manipulate the graphical element representing the allocation parameters can alternatively include receiving (506) user input to snap to a predetermined resource allocation value. In the example method of FIG. 8, the graphical user interface (418) may include predetermined locations within the graphical user interface (418) that represent predetermined resource allocation values. Consider an example in which the graphical user interface (418) includes a visual depiction as illustrated in FIGS. 5-6. Assume that in such an example, each axis includes points that represent predetermined resource allocation values. For example, a particular point on the RAM axis may represent a user having 128 GB of RAM allocated for use by the user. In such an example, receiving (506) user input to snap to a predetermined resource allocation value may be carried out by receiving a mouse click from the user (422) at a coordinate location within the graphical user interface (418) that is within the particular point on the RAM axis that represents the user (422) having 128 GB of RAM allocated for use by the user (422). In such a way, the user may select predetermined amounts of various resources that will be allocated for use by the user (422), rather than manually manipulating elements within the graphical user interface (418) that result in fractional or otherwise abnormal amounts of resources being allocation for use by the user (422).

The example method of FIG. 8 also includes displaying (502), within the graphical user interface (418), capacity parameters associated with the maximum capacity of the one or more resources (406, 408) of the cloud computing environment (400). In the example method of FIG. 8, the maximum capacity of the one or more resources (406, 408) of the cloud computing environment (400) may represent the total amount of the one or more resources (406, 408) that are within the cloud computing environment (400), the maximum amount of the one or more resources (406, 408) that may be allocated to a particular user, the maximum amount of the one or more resources (406, 408) that are within the cloud computing environment (400) that may be allocated to all users, and so on. In such an example, displaying (502) the capacity parameters associated with the maximum capacity of the one or more resources (406, 408) of the cloud computing environment (400) may be carried out, for example, by placing a graphical element on each axis depicted within the graphical user interface (418) at a point that corresponds to the capacity parameters. In such an example, by displaying (502) capacity parameters associated with the maximum capacity of the one or more resources (406, 408) of the cloud computing environment (400) within the graphical user interface (418), the user (422) may be aware of the extent to which the user can be allocated one or more resources (406, 408).

Figure 9:
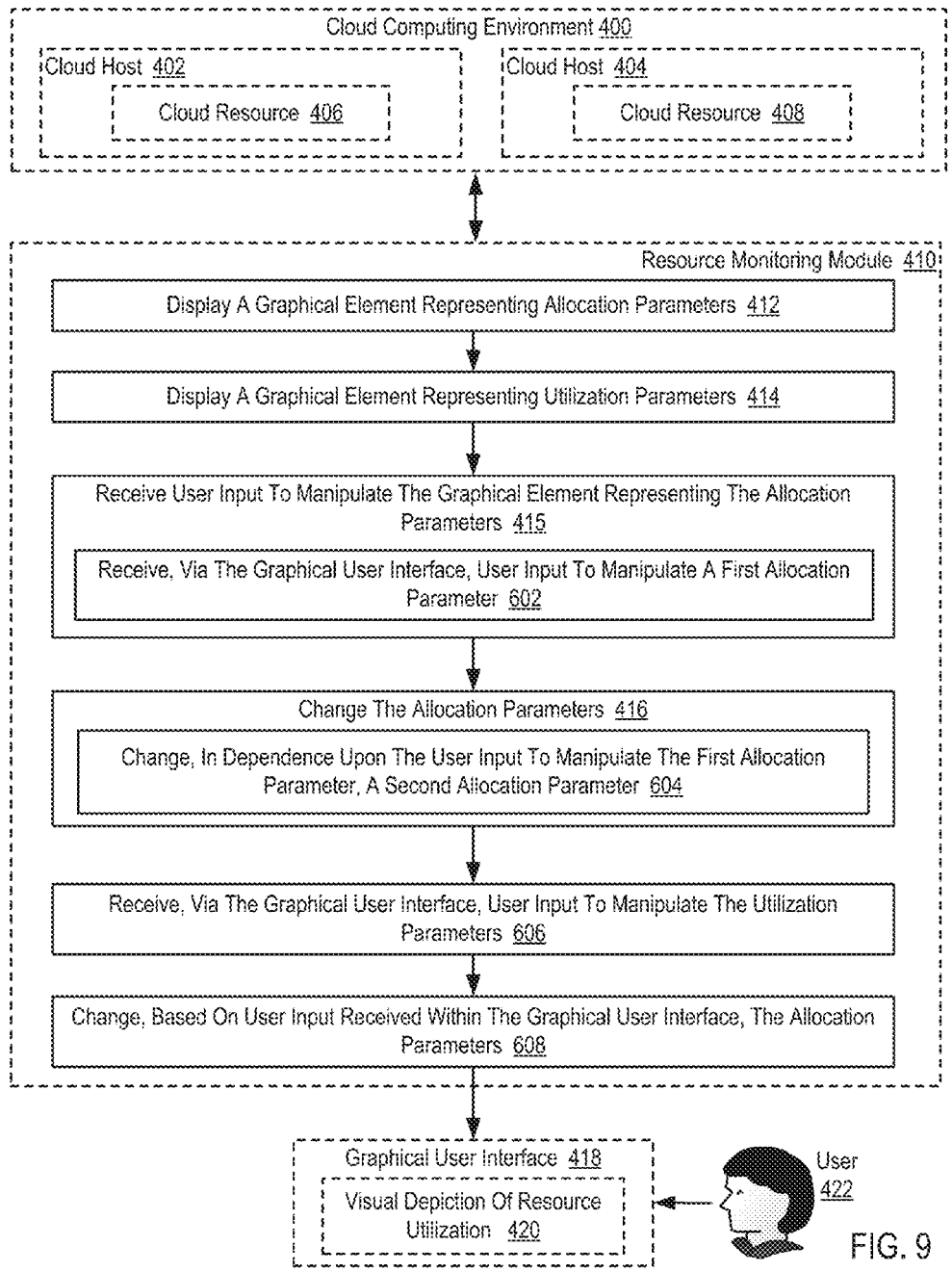
FIG. 9 sets forth a flow chart illustrating an additional example method for resizing resource allocation in a computing environment according to embodiments of the present invention.

For further explanation, FIG. 9 sets forth a flow chart illustrating an additional example method for resizing resource allocation in a cloud computing environment (400) according to embodiments of the present invention. The example method of FIG. 9 is similar to the example method of FIG. 7, as it also includes displaying (412) allocation parameters indicating a user's current allocation of one or more resources (406, 408) of the cloud computing environment (400), displaying (414) utilization parameters indicating the user's current utilization of the one or more resources (406, 408) of the cloud computing environment (400), receiving (415) user input to manipulate the graphical element representing the allocation parameters, and changing (416) the allocation parameters.

In the example method of FIG. 9, receiving (415) user input to manipulate the graphical element representing the allocation parameters can include receiving (602), via the graphical user interface (418), user input to manipulate a first allocation parameter. In the example method of FIG. 9, user input to manipulate a first allocation parameter may be received through the use of a user input device such as a mouse. For example, the user (422) may select a graphical element that represents the first allocation parameter and manipulate such a graphical element by dragging a pointer so as to expand or contract the graphical element, by clicking on an axis in the graphical user interface (418) so as to change the allocation of a particular resource associated with the axis, and so on. In such an example, receiving (602) user input to manipulate a first allocation parameter may be carried out by monitoring an input device for user input.

In the example method of FIG. 9, changing (416) the allocation parameters can include changing (604), in dependence upon the user input to manipulate the first allocation parameter, a second allocation parameter. Consider an example in which a first allocation parameter specifies the number of virtual machines in the cloud computing environment that are allocated for use by the user (422) and the second allocation parameter specifies the amount of memory in the cloud computing environment that is allocated for use by the user (422). In such an example, after receiving (602) user input to manipulate the number of virtual machines in the cloud computing environment that are allocated for use by the user (422), changing (416) the allocation parameter associated with the number of virtual machines in the cloud computing environment that are allocated for use by the user (422) can also include changing (604) the second allocation parameter specifying the amount of memory in the cloud computing environment that is allocated for use by the user (422). In such an example, changing (604) the second allocation parameter is done in dependence upon the user input to manipulate the first allocation parameter. Consider an example in which the user input to manipulate the first allocation parameter indicated that the user (422) requested that the number of virtual machines in the cloud computing environment that are allocated for use by the user (422) be increased by 50%. In such an example, changing (604) the second allocation parameter in dependence upon the user input to manipulate the first allocation parameter may therefore include changing (604) the second allocation parameter such that the amount of memory in the cloud computing environment that is allocated for use by the user (422) is also increased by 50%.

The example method of FIG. 9 also includes receiving (606), via the graphical user interface (418), user input to manipulate the graphical element representing the utilization parameters. In the example method of FIG. 9, user input to manipulate the graphical element representing the utilization parameters may be received through the use of a user input device such as a mouse. For example, the user (422) may select a graphical element that represents the utilization parameters and manipulate such a graphical element by dragging a pointer so as to expand or contract the graphical element, by clicking on an axis in the graphical user interface (418) so as to change the utilization of a particular resource associated with the axis, and so on. In such an example, receiving (606) user input to manipulate the utilization parameters may be carried out by monitoring an input device for user input.

The example method of FIG. 9 also includes changing (608), based on user input received within the graphical user interface (418), the utilization parameters.

Consider an example in which the utilization parameters indicate that an application is utilizing ten virtual machines that are allocated for use by the user (422). In such an example, assume that the user (422) uses a mouse to user manipulate the utilization parameters such that the user (422) is requesting that the application utilizes an additional ten virtual machines that are allocated for use by the user (422). In such an example, changing (608) the utilization parameters may therefore be carried out by ultimately creating additional instances of the application and migrating an additional instance of the application to each of the ten additional virtual machines.

Resizing resource allocation in a cloud computing environment in accordance with the present invention is generally implemented with computers, that is, with automated computing machinery. For further explanation, therefore, FIG. 10 sets forth a block diagram of automated computing machinery comprising an example computer (752) useful in resizing resource allocation in a cloud computing environment according to embodiments of the present invention. The computer (752) of FIG. 10 includes at least one computer processor (756) or 'CPU' as well as random access memory (768) ('RAM') which is connected through a high speed memory bus (766) and bus adapter (758) to processor (756) and to other components of the computer (752).

Stored in RAM (768) is a resource monitoring module (509), a module of computer program instructions for visually depicting cloud resource utilization. The cloud computing environment (500) of FIG. 10 may be similar to the cloud computing environment (122) depicted in FIGS. 1-4. The cloud resources (506, 508) of such a cloud computing environment (500) can therefore include the various services and the various resources depicted in FIGS. 1-4. Likewise, the cloud hosts (502, 504) of such a cloud computing environment (500) can include the physical and virtual resources depicted and described with respect to FIGS. 1-4, as well as physical resource, virtual resources such as a plurality of virtual machines, or other resources as will occur to those of skill in the art.

Figure 10:
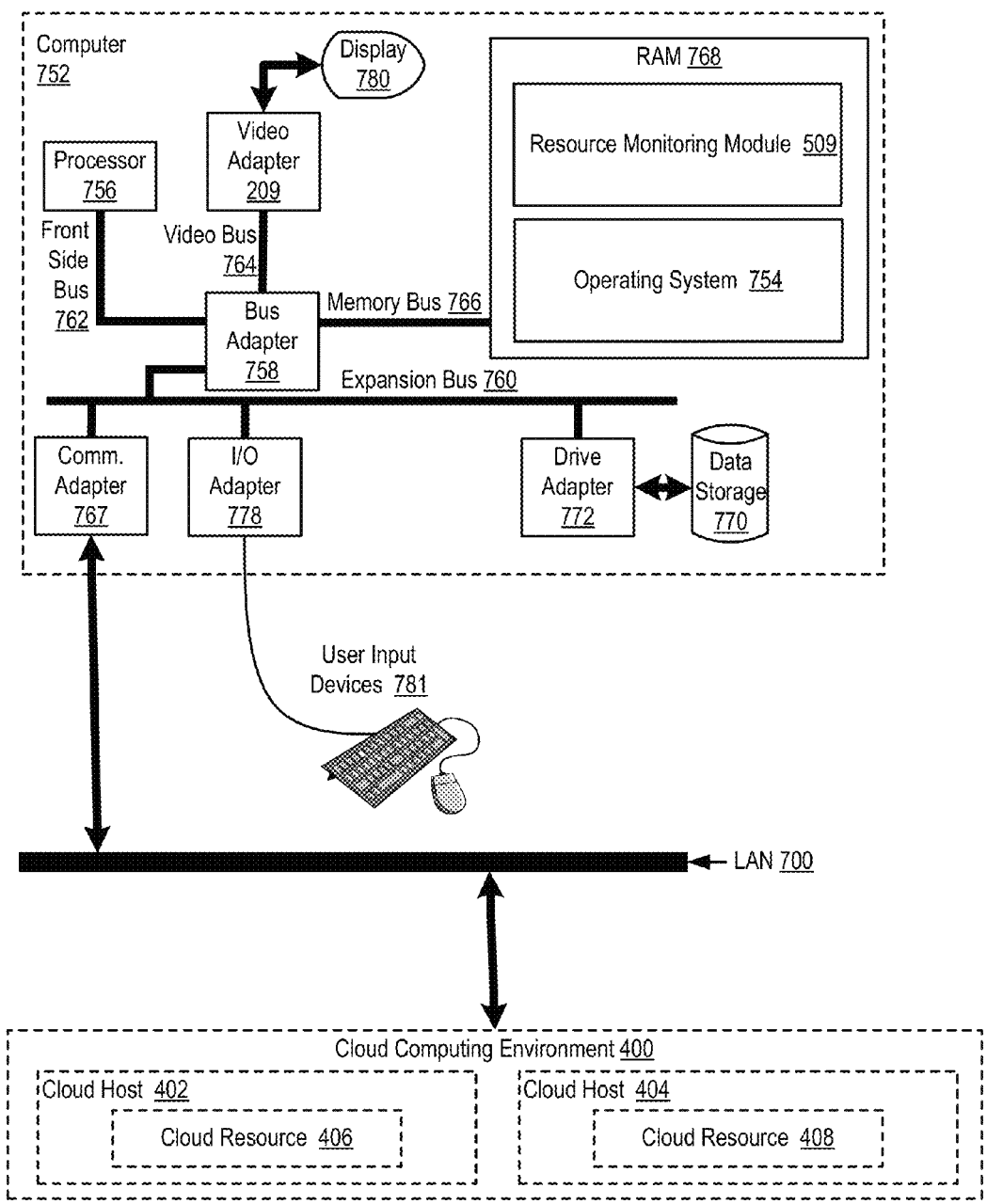
FIG. 10 sets forth a block diagram of automated computing machinery comprising an example computer useful in resizing resource allocation in a computing environment according to embodiments of the present invention.

The resource monitoring module (509) of FIG. 10 may be configured to: display, within a graphical user interface, a graphical element representing allocation parameters, the allocation parameters indicating a user's current allocation of one or more resources (406, 408) of the cloud computing environment (400); display, within the graphical user interface, a graphical element representing utilization parameters, the utilization parameters indicating the user's current utilization of the one or more resources (406, 408) of the cloud computing environment (410); receive, within the graphical user interface, user input to manipulate the graphical element representing the allocation parameters; and change, based on user input received via the graphical user interface, the allocation parameters.

Also stored in RAM (768) is an operating system (754). Operating systems useful in resizing resource allocation in a cloud computing environment according to embodiments of the present invention include UNIX™, Linux™, Microsoft Windows™, AIX™, IBM's i5/OS™, Android™ OS, Apple™ iOS, and others as will occur to those of skill in the art. The operating system (754) and the resource monitoring module (509) in the example of FIG. 10 are shown in RAM (768), but many components of such software typically are stored in non-volatile memory also, such as, for example, on a disk drive (770).

The computer (752) of FIG. 10 includes disk drive adapter (772) coupled through expansion bus (760) and bus adapter (758) to processor (756) and other components of the computer (752). Disk drive adapter (772) connects non-volatile data storage to the computer (752) in the form of disk drive (770). Disk drive adapters useful in computers for resizing resource allocation in a cloud computing environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (752) of FIG. 10 includes one or more input/output ('I/O') adapters (778). I/O adapters implement user-oriented input/output through, for example, software drivers and computer hardware for controlling output to display devices such as computer display screens, as well as user input from user input devices (781) such as keyboards and mice. The example computer (752) of FIG. 10 includes a video adapter (209), which is an example of an I/O adapter specially designed for graphic output to a display device (780) such as a display screen or computer monitor. Video adapter (209) is connected to processor (756) through a high speed video bus (764), bus adapter (758), and the front side bus (762), which is also a high speed bus.

The example computer (752) of FIG. 10 includes a communications adapter (767) for data communications with other computers (782) and for data communications with a data communications network (700). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for resizing resource allocation in a cloud computing environment according to embodiments of the present invention include modems for wired dial-up communications, Ethernet (IEEE 802.3) adapters for wired data communications network communications, and 802.11 adapters for wireless data communications network communications.

Example embodiments of the present invention are described largely in the context of a fully functional computer system for visually depicting resource utilization in a cloud computing environment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of resizing resource allocation in a computing environment, the method comprising:

displaying, within a graphical user interface, a graphical element representing allocation parameters of at least two types of resources, the allocation parameters indicating a user's current allocation of the at least two types of resources of the computing environment;
displaying, within the graphical user interface, a graphical element representing utilization parameters of the at least two types of resources, the utilization parameters indicating the user's current utilization of the at least two types of resources of the computing environment;
receiving, within the graphical user interface, user input to manipulate the graphical element representing the allocation parameters; and
changing, based on the user input received within the graphical user interface, the allocation parameters.

2. The method of claim 1 wherein receiving user input to manipulate the graphical element representing the allocation parameters further comprises receiving user input to change the size of the graphical element representing the allocation parameters.

3. The method of claim 1 wherein receiving user input to manipulate the graphical element representing the allocation parameters further comprises receiving user input to snap to a predetermined resource allocation value.

4. The method of claim 1 further comprising displaying, within the graphical user interface, capacity parameters associated with the maximum capacity of the at least two types of resources of the computing environment.

5. The method of claim 1 wherein receiving user input to manipulate the graphical element representing the allocation parameters further comprises receiving, within the graphical user interface, user input to manipulate a first allocation parameter; and
wherein changing the allocation parameters further comprises changing, in dependence upon the user input to manipulate the first allocation parameter, a second allocation parameter.

6. The method of claim 1 further comprising:
receiving, via the graphical user interface, user input to manipulate the graphical element representing the utilization parameters; and
changing, based on the user input received within the graphical user interface, the utilization parameters.

7. An apparatus for resizing resource allocation in a computing environment, the apparatus comprising a computer processor, a computer memory operatively coupled to the computer processor, the computer memory having disposed within it computer program instructions that, when executed by the computer processor, cause the apparatus to carry out the steps of:
displaying, within a graphical user interface, a graphical element representing allocation parameters of at least two types of resources, the allocation parameters indicating a user's current allocation of the at least two types of resources of the computing environment;
displaying, within the graphical user interface, a graphical element representing utilization parameters of the at least two types of resources, the utilization parameters indicating the user's current utilization of the at least two types of resources of the computing environment;
receiving, within the graphical user interface, user input to manipulate the graphical element representing the allocation parameters; and
changing, based on the user input received within the graphical user interface, the allocation parameters.

8. The apparatus of claim 7 wherein receiving user input to manipulate the graphical element representing the allocation parameters further comprises receiving user input to change the size of the graphical element representing the allocation parameters.

9. The apparatus of claim 7 wherein receiving user input to manipulate the graphical element representing the allocation parameters further comprises receiving user input to snap to a predetermined resource allocation value.

10. The apparatus of claim 7 further comprising computer program instructions that, when executed by the computer processor, cause the apparatus to carry out the step of displaying, within the graphical user interface, capacity parameters associated with the maximum capacity of the at least two types of resources of the computing environment.

11. The apparatus of claim 7 wherein receiving user input to manipulate the graphical element representing the allocation parameters further comprises receiving, within the graphical user interface, user input to manipulate a first allocation parameter; and
wherein changing the allocation parameters further comprises changing, in dependence upon the user input to manipulate the first allocation parameter, a second allocation parameter.

12. The apparatus of claim 7 further comprising computer program instructions that, when executed by the computer processor, cause the apparatus to carry out the steps of:
receiving, via the graphical user interface, user input to manipulate the graphical element representing the utilization parameters; and
changing, based on the user input received within the graphical user interface, the utilization parameters.

13. A computer program product for resizing resource allocation in a computing environment, the computer program product disposed upon a computer readable medium, wherein the computer readable medium is not a signal, the computer program product comprising computer program instructions that, when executed, cause a computer to carry out the steps of:
displaying, within a graphical user interface, a graphical element representing allocation parameters of at least two types of resources, the allocation parameters indicating a user's current allocation of the at least two types of resources of the computing environment;
displaying, within the graphical user interface, a graphical element representing utilization parameters of the at least two types of resources, the utilization parameters indicating the user's current utilization of the at least two types of resources of the computing environment;
receiving, within the graphical user interface, user input to manipulate the graphical element representing the allocation parameters; and
changing, based on the user input received within the graphical user interface, the allocation parameters.

14. The computer program product of claim 13 wherein receiving user input to manipulate the graphical element representing the allocation parameters further comprises receiving user input to change the size of the graphical element representing the allocation parameters.

15. The computer program product of claim 13 wherein receiving user input to manipulate the graphical element representing the allocation parameters further comprises receiving user input to snap to a predetermined resource allocation value.

16. The computer program product of claim 13 further comprising computer program instructions that, when executed, cause the computer to carry out the step of displaying, within the graphical user interface, capacity parameters associated with the maximum capacity of the at least two types of resources of the computing environment.

17. The computer program product of claim 13 wherein receiving user input to manipulate the graphical element representing the allocation parameters further comprises receiving, within the graphical user interface, user input to manipulate a first allocation parameter; and
  wherein changing the allocation parameters further comprises changing, in dependence upon the user input to manipulate the first allocation parameter, a second allocation parameter.

18. The computer program product of claim 13 further comprising computer program instructions that, when executed, cause the computer to carry out the steps of:
  receiving, via the graphical user interface, user input to manipulate the graphical element representing the utilization parameters; and
  changing, based on the user input received within the graphical user interface, the utilization parameters.

* * * * *